Nov. 3, 1964     A. G. RICARD     3,155,348
AIRCRAFT FUSELAGE
Filed May 7, 1963     2 Sheets-Sheet 2
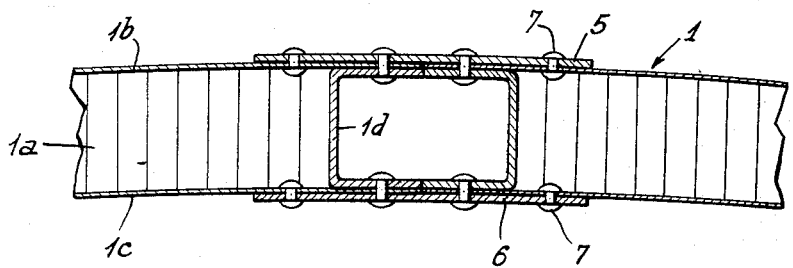
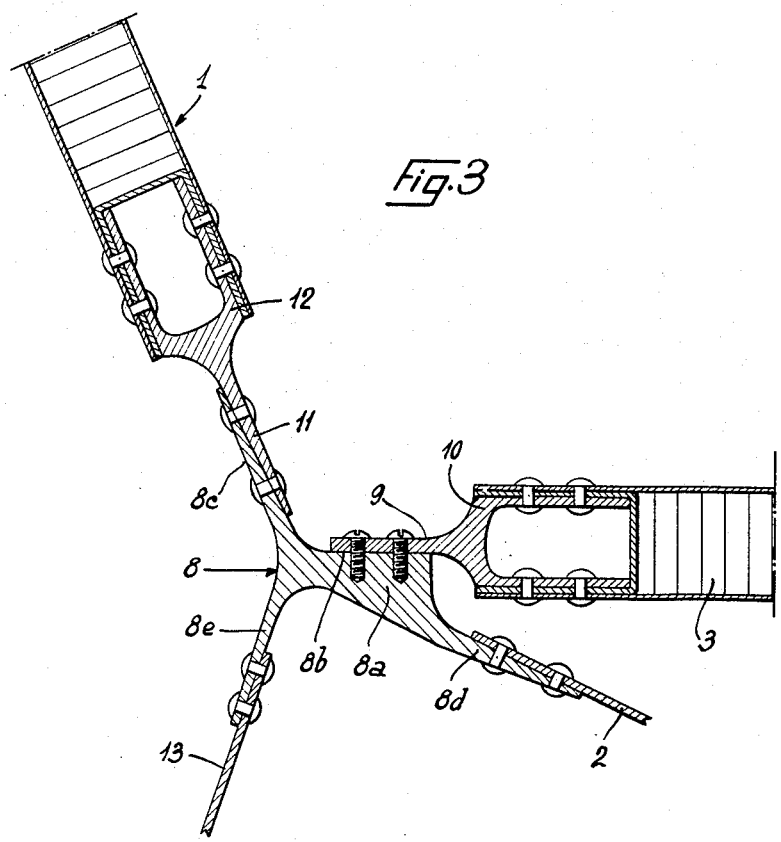

United States Patent Office 3,155,348
Patented Nov. 3, 1964

3,155,348
AIRCRAFT FUSELAGE
Armand G. Ricard, Viroflay, France, assignor to Societe Anonyme des Ateliers d'Aviation Louis Breguet, Paris, France, a company of France
Filed May 7, 1963, Ser. No. 278,588
Claims priority, application France, June 14, 1962, 900,749
6 Claims. (Cl. 244—119)

The present invention relates to improvements in the construction of aircraft fuselages and more particularly in the construction of pressurized fuselages, that is to say those whose living space is maintained at a constant pressure which is substantially equal to the normal atmospheric pressure.

Up to the present time, pressurized fuselages have been constructed by means of sheet metal parts fixed to a skeleton, their cross-section being approximated as far as possible to a circular form in order to avoid the high stresses which could develop at the places where curvature varies.

Such fuselages are heavy and complicated. They also entail considerable labor costs and result in a considerable amount of dead space.

One of the improvements according to the present invention consists essentially in constructing a pressurized fuselage by means of three main elements or portions namely: an upper wall of substantially circular cross-section extending over an angle distinctly greater than 180°, a substantially plane floor extending from one edge of the upper wall to the other, and a lower wall which is tied to the floor and has a radius of curvature preferably greater than the radius of curvature of the upper wall, the adjacent edges of these three elements being connected together by longitudinal connecting members girders or beams whose central portion is fixed to the floor and which comprise two thin flexible flanges which are respectively fixed to the edges of the walls to which they are substantially tangential.

By connecting the walls subjected to pressure differences by means of flexible flanges, the secondary moments due to differences in the curvature of the walls are reduced. Thus it is possible to use for the lower wall a considerable greater radius of curvature than that of the upper wall, thus considerably reducing dead spaces below the floor.

Owing to the easy assembly of the fuselage elements, and their strength when assembled, the walls and the floor can be constructed by means of honeycomb-structure panels, which gives the fuselage great lightness and considerable rigidity, whilst facilitating construction by reason of the easy machining, the simple equipment required and the reduced number of rivets required for assembling the various elements.

The inner faces of the walls of the fuselage comprise substantially no protuberances or projections, and therefore the internal fitting-out of the fuselage is easy.

Sound-proofing qualities are also good and there are fewer problems of sealing-tightness since the number of rivet holes is reduced.

It should be added that the working life of the fuselage is prolonged as a result of the strength of the honeycomb panels and owing to the fact that their use obviates the oscillation phenomena which occur when sheet metal is employed.

The longitudinal connecting members can also comprise a supplementary flexible flange permitting the mounting, below the lower wall, of a lobe of considerable size which can be used as a storage space in the aircraft and which can be connected at any desired angle to the upper lobe.

The invention is illustrated by way of example in the accompanying drawings, in which:

FIGURES 2 and 3 are sectional views on a larger scale showing details of the assembly of various elements of the fuselage.

Figure 1:
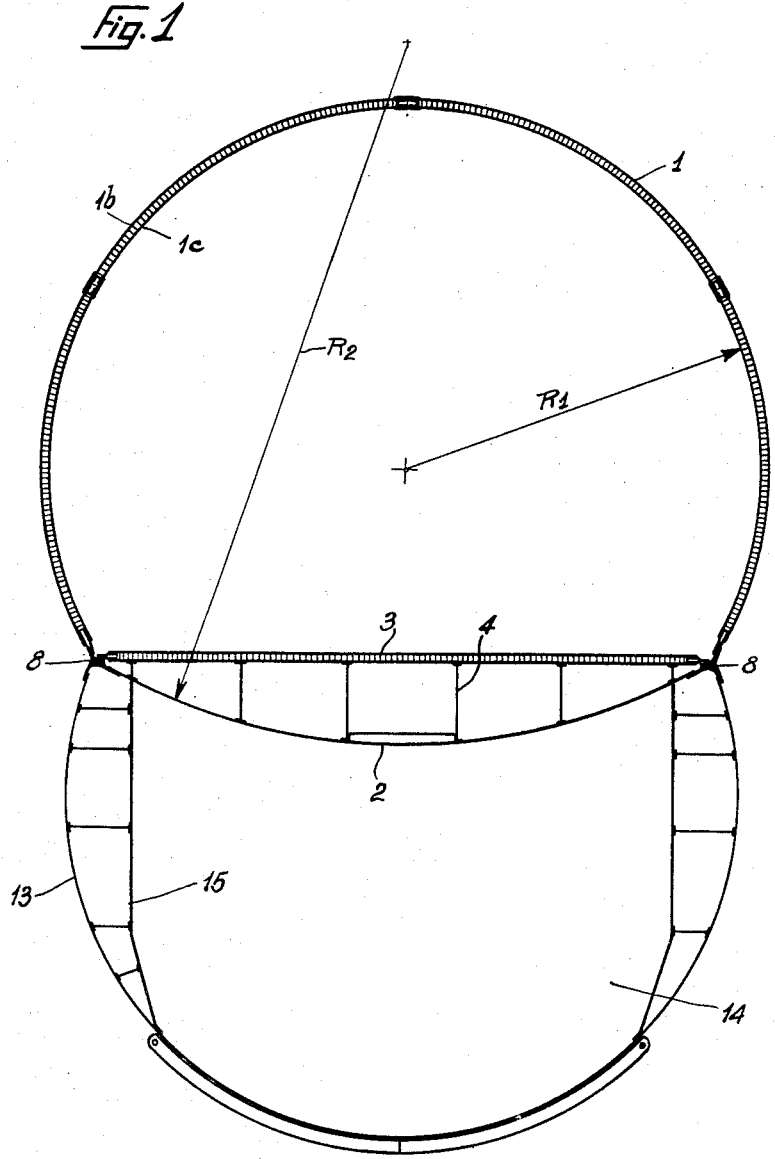
FIGURE 1 is a diagrammatic transverse sectional view of a fuselage according to the invention.

In the form of embodiment illustrated in the drawings, the upper space of the fuselage, which is to be pressurized, is bounded on the one hand by an upper wall 1 of substantially circular cross-section which extends over an angle considerably greater than 180°, in the present case about 240°, and whose radius of curvature $R_1$ varies, naturally, in accordance with the longitudinal axis of the fuselage, and on the other hand by a lower wall 2 whose radius of curvature $R_2$ is considerably greater than the radius $R_1$.

Provided above the wall 2 is a substantially plane floor 3 which is arranged along the chordal plane common to the two walls.

It is known that under the effect of the differences in the pressure prevailing inside and outside the fuselage, at the edges of the walls there develop stresses tangential to the said walls which result in compressive forces directed in the internal direction, on the floor 3 which acts as compression member for the fuselage.

This floor is tied to the lower wall 2 by means of a framework 4 or girder of which the lower wall 2 is a component.

The wall 1 and the floor 3 are preferably made of honeycomb panels of well known type.

The wall 1 can be made of several panels suitably curved and connected to one another as shown in FIGURE 2.

The panels, whose honeycomb lining 1a is gripped between sheet metal facings 1b and 1c, and also between U-shaped channel sections 1d, are placed end to end and are secured over their facings at the U-shaped sections 1d with joint straps made of sheet metal 5 and 6 which are fixed by means of rivets 7.

The three basic elements or portions of the fuselage are connected together by means of longitudinal members or girders 8 have radiating arms as shown in detail in FIGURE 3.

Each member 8 comprises a web 8a which has a connecting surface 8b to which is fixed a flexible tongue 9 substantially Y-shaped connecting part 10 fixed to the floor 3.

It also comprises a thin flexible flange 8c to which is fixed, by rivets for example, a flexible tongue 11 of a substantially Y-shaped connecting part 12 which is itself fixed to the edge of the wall 1. A second thin flexible flange 8d is provided for fixing thereto the edge of the lower wall 2.

The flanges 8c and 8d are directed substantially in accordance with planes tangential to the edges of the walls and they intersect, with the connecting surface 8b, along the neutral line of the member 8.

In view of the flexibility of the connection between the various elements, the secondary moments due to deformations which occur remain very small.

The members 8 comprise a third thin flexible flange 8e which also intersects the two others and serves to fix thereto the outer wall 13 of a storage space 14 which is also of circular cross-section and whose framework 15 is fixed to that of the upper portion of the fuselage, as FIGURE 1 shows. The outer wall of the storage space also extends over an angle greater than 180°. The small curvature of the wall 2 leaves free a maximum amount of space within the said storage compartment.

I claim:

1. An aircraft fuselage capable of being pressurized comprising in combination: an upper wall portion of substantially circular cross-section extending over an angle greater than 180°, a floor portion extending from one edge of the upper wall portion to the other, a lower wall portion having a radius of curvature at least equal to that of the upper wall portion, and longitudinal members connecting the adjacent edges of the said three portions to one another, said members each comprising a web to which is fixed the said floor portion and thin flexible flanges extending from said web in substantially tangential relationship with said wall portions to which they are respectively fixed.

2. An aircraft fuselage as claimed in claim 1 wherein said upper wall portion and said floor portion are made of honeycomb panels sandwiched between outer sheets which are secured to U-shaped connecting sections provided with extensions by means of which they are secured to said flexible flanges.

3. An aircraft fuselage as claimed in claim 1, wherein the floor portion and the lower wall portion are tied to each other by a girder-like framework.

4. An aircraft fuselage, capable of being pressurized, comprising in combination: an upper wall portion of substantially circular cross-section extending over an angle greater than 180°, a floor portion extending from one edge of the upper wall portion to the other, a lower wall portion having a radius of curvature at least equal to that of the upper wall portion and extending also from one edge of said upper wall portion to the other; a storage structure having an outer wall portion of substantially circular cross-section located below said lower wall portion, said outer wall portion extending from one edge of the upper wall portion to the other; and longitudinal members connecting the adjacent edges of said four portions to one another, said longitudinal members each comprising a web to which is fixed the said floor portion, and thin flexible flanges extending from said web in substantially tangential relationship with the wall portions to which they are respectively fixed.

5. An aircraft fuselage as claimed in claim 4, wherein said floor portion and said lower wall portion are tied to each other by a girder-like framework and the outer wall portion of said storage structure is also tied to said framework.

6. An aircraft fuselage as claimed in claim 5, wherein said outer wall portion of said storage structure extends over an angle greater than 180°.

References Cited in the file of this patent

UNITED STATES PATENTS

| | | |
|---|---|---|
| 1,475,210 | Upson | Nov. 27, 1923 |
| 2,003,433 | Ford | June 4, 1935 |

OTHER REFERENCES

Honeycomb Sandwich Design by Hexcel Products Inc., Brochure "E," 1959, pp. 1–3.